United States Patent [19]

Saito

[11] Patent Number: 4,711,533
[45] Date of Patent: Dec. 8, 1987

[54] STANDARD ZOOM LENS SYSTEM HAVING A LARGE APERTURE RATIO

[75] Inventor: Yoshiharu Saito, Koganei, Japan

[73] Assignee: Olympus Optical Co., Ltd., Tokyo, Japan

[21] Appl. No.: 766,422

[22] Filed: Aug. 16, 1985

[30] Foreign Application Priority Data

Aug. 20, 1984 [JP] Japan .................. 59-171509

[51] Int. Cl.$^4$ ............... G02B 15/14; G02B 13/18
[52] U.S. Cl. ................... 350/426; 350/432; 350/450
[58] Field of Search ........... 350/426, 428, 423, 427, 350/450, 432, 435

[56] References Cited

U.S. PATENT DOCUMENTS 4,153,338  5/1979  Fujii ........................ 350/426
4,153,339  5/1979  Tajima et al. ............. 350/426

FOREIGN PATENT DOCUMENTS 58-60717  4/1983  Japan ..................... 350/426

Primary Examiner—Bruce Y. Arnold
Assistant Examiner—Scott J. Sugarman
Attorney, Agent, or Firm—Cushman, Darby & Cushman

[57] ABSTRACT

A standard zoom lens system with a large aperture ratio comprising a front lens group having a negative refracting power, a rear lens group having a positive refracting power and a diaphragm arranged in the rear lens group in which at least one of lens surface of the rear lens group which surface is positioned at the front side of a diaphragm is formed as an aspherical surface, thereby enabling to have various aberrations well corrected and make the system compact.

8 Claims, 15 Drawing Figures

STANDARD ZOOM LENS SYSTEM HAVING A LARGE APERTURE RATIO

BACKGROUND OF THE INVENTION (a) Field of the Invention

This invention relates to a standard zoom lens system comprising two lens groups and having a large aperture ratio, in which the angle of view varies from about 35° to 60°.

(b) Description of the Prior Art

Zoom lens systems comprising two lens groups have been known. However, in a compact zoom lens system having a small F-number, spherical aberration caused by zooming is large and this aberration is not balanced with other aberrations, so that a desired performance cannot be obtained. In order to improve the performance it is necessary to increase the number of lenses, which means enlargement in size and is against the requirement for compactness of a lens system.

Known zoom lens systems comprising two lens groups similar to the zoom lens system according to the present invention are disclosed in Japanese Published Unexamined Patent Application No. 153752/77 and Japanese Published Unexamined Patent Application No. 60717/83. The lens system disclosed in the former has a small aperture ratio and that disclosed in the latter has a large number of lenses and a complex configuration, so that the system is not compact.

SUMMARY OF THE INVENTION

It is a primary object of the present invention to provide a standard zoom lens system comprising two lens groups in which, although the system is compact and has a large aperture ratio of 2.8 at the wide-position (the position with minimum focal length) and 3.5 at the tele-position (the position with maximum focal length), various aberrations are well corrected.

The zoom lens system according to the present invention comprises a front diverging lens group and a rear converging lens group in which the space between the front lens group and rear lens group is varied for zooming.

A characteristic of the zoom lens system according to the present invention resides in that at least one of the lens surfaces of the rear lens group which surface is positioned at the front side, i.e., the object side, of the diaphragm is formed as an aspherical surface, the shape of which is described hereinafter.

In a zoom lens system comprising two lens groups, the front lens group has a negative power, so that the height of the ray incident on the above mentioned lens surface of the rear lens group which surface is positioned at the front side of the diaphragm is the highest. Therefore, when at least one of these lens surfaces positioned at the front side of the diaphragm is formed as an aspherical surface, spherical aberration can be corrected effectively, and since this aspherical surface is located near the diaphragm, curvature of field, astigmatism etc. will be little influenced by it, so that aberrations will be well corrected with balance.

It is desirable to form the object side surface of a positive lens as the above mentioned aspherical surface. This is because spherical aberration can be corrected efficiently at the position where the height of the ray is the highest, and in the case of the positive lens positioned at the front side of the diaphragm the generation of spherical aberration by the object side surface is much larger than that by the image side surface.

It is effective for the shape of the above mentioned aspherical surface to satisfy the following condition (1):

$$-0.001 > \Delta x / R_A > -0.007 \quad (1)$$

where $R_A$ represents the radius of curvature of the reference spherical surface (which is tangential to the aspherical surface at the vertex thereof), $\Delta x$ represents the difference parallel to the optical axis between the point on the aspherical surface and that on the reference spherical surface at the maximum effective aperture of the aspherical lens.

FIG. 15 shows a diagramatic view illustrating the shape of an aspherical surface. In this figure, A represents an aspherical surface, B represents a circle the radius of curvature of which is $R_A$.

When the x axis is set as the optical axis and the y axis is set vertical to the x axis and tangential to the aspherical surface A at the vertex thereof, the shape of the aspherical surface may be expressed by the following formula (a):

$$x = \frac{y^2 / R_A}{1 + \sqrt{1 - (y/R_A)^2}} + By^2 + Cy^4 + Dy^6 + Ey^8 + Fy^{10} + \ldots \quad (a)$$

where B, C, D, ... represent the coefficients of the aspherical surface. Therefore, when the maximum effective aperture is set at $y = y_A$, the difference $\Delta x$ of the aspherical surface may be expressed by the following formula (b):

$$\Delta x = By_A^2 + Cy_A^4 + Dy_A^6 + \ldots \quad (b)$$

In an ordinary spherical surface, the higher the height from the optical axis becomes, the stronger the refracting function becomes. Therefore, in order to correct spherical aberration, it is necessary for the difference $\Delta x$ between the aspherical surface and the reference spherical surface to have a negative value such that the higher the height from the optical axis becomes, the weaker the curvature of the surface becomes. In the zoom lens system comprising two lens groups, at least, one negative lens and one positive lens are arranged in the rear lens group at the image side of the diaphragm. In order to reduce the generation of spherical aberration of the lens system, it is necessary to make the refracting powers of such negative lens and positive lens stronger to a certain degree. In that case, the correction of astigmatic difference and curvature of field becomes difficult.

When the aspherical surface is formed such that the difference thereof is confined in the limits provided by the condition (1) and that the generation of spherical aberration becomes small, it will be possible to make the refracting powers of the above mentioned negative lens and positive lens weak, and to make astigmatic difference and curvature of field small, thereby making it possible to improve remarkably the performance at a higher image height. Therefore, if the condition (1) is not satisfied, since spherical aberration becomes large and astigmatic difference and curvature of field also become large, the performance especially at a higher image height will deteriorate.

When the aspherical lens mentioned above is a positive meniscus lens, it will be desirable to satisfy the following condition (2):

$$f_A/f_R > 2.5 \qquad (2)$$

where $f_A$ represents the focal length of the aspherical lens, and $f_R$ represents the focal length of the rear lens group.

When an aspherical surface is or becomes eccentric, the variation in aberrations becomes large. The stronger the refractive power of the spherical lens becomes, the larger the influence of the decentering thereof on aberrations becomes. With this view taken into account, the condition (2) is established. If the value defined by the condition (2) exceeds the lower limit of that condition the refracting power of the aspherical lens will become strong and the variation in aberrations by the decentering will become large, which will not be desirable. When a plastic lens is used as an aspherical lens, it will be desirable to satisfy the condition (2) because the amount of defocusing by the change of the temperature can be made small.

Further, as shown in FIG. 1 and FIG. 2, the lens system according to the present invention comprises a front lens group and a rear lens group, the front lens group comprising, in the order from the object, a first lens component being a negative meniscus lens having at its image side a surface with a smaller radius of curvature, a second lens component being a negative lens having at its image side a surface with a smaller radius of curvature, and a third lens component being a positive lens having at its object side a surface with a smaller radius of curvature, the rear lens group comprising, in the order from the object, a fourth lens component being a positive lens, a fifth lens component being a positive lens, a sixth lens component being a positive cemented meniscus lens, a seventh lens component being a negative lens having at its image side a surface with a smaller radius of curvature, and an eighth component being a positive meniscus lens having at its image side a surface with a smaller radius of curvature, and satisfies the following conditions (3) through (6):

$$0.7 < f_3/|f_F| < 1.2 \qquad (3)$$

$$0.1 < d_4/f_W < 0.16 \qquad (4)$$

$$0.7 < |f_7|/f_W < 1.3 \qquad (5)$$

$$1.2 < f_8/f_R < 1.8 \qquad (6)$$

where $f_F$ represents the focal length of the front lens group, $f_W$ represents the focal length of the entire system at the wide angle position, $f_3$, $f_7$, $f_8$ respectively represent the focal length of the third, seventh, eighth lens components, and $d_4$ represents the airspace between the second lens component and the third lens component.

The conditions (3) and (4) are established to correct coma aberration of g-line and to make the entire system compact.

If the value defined by the condition (3) exceeds the upper limit of that condition, coma aberration of g-line will be undercorrected. If the value defined thereby exceeds the lower limit thereof, it will be necessary to make $d_4$ so large in order to balance various aberrations that it will be impossible to make the entire system compact.

If the value defined by the condition (4) exceeds the upper limit of that condition, although this in itself is desirable for correcting aberrations, it will be impossible to make the entire system compact. If the value defined thereby exceeds the lower limit thereof, it will be necessary to make the refracting power of the third lens component so strong that the correction of coma aberration of g-line cannot be done.

The conditions (5) and (6) are for establishing a satisfactory balance between astigmatism and distortion. If the values defined by these conditions exceed the upper limits thereof, astigmatic difference will become small but negative distortion will become large and it will be impossible to make the entire system compact. If the values defined thereby exceed the lower limits thereof, aberration in the seventh lens component and the eighth lens component will become large and it will be impossible to make astigmatic difference small.

DETAIL DESCRIPTION OF THE PREFERRED EMBODIMENTS

Figure 1:
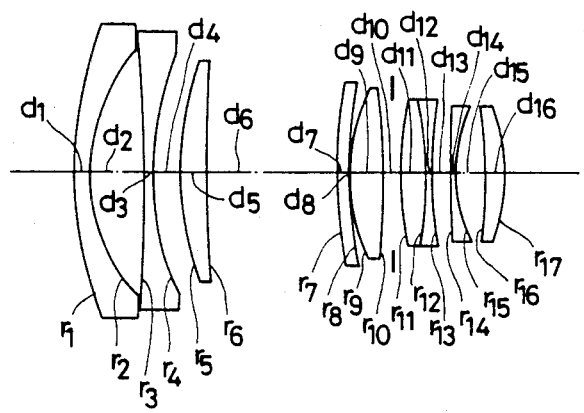
FIG. 1 shows a sectional view of Embodiments 1, 3, and 4 according to the present invention.

Preferred Embodiments of the zoom lens system according to the present invention explained in detail in the above are shown below:

| Embodiment 1 | | |
|---|---|---|
| $f = 35.9 - 67.7$ | F No. $= 2.9 - 3.6$ | |
| $r_1 = 69.6747$ | | |
| $d_1 = 2.150$ | $n_1 = 1.72916$ | $v_1 = 54.68$ |
| $r_2 = 30.0009$ | | |
| $d_2 = 9.003$ | | |
| $r_3 = -216.6740$ | | |
| $d_3 = 1.830$ | $n_2 = 1.65830$ | $v_2 = 57.33$ |
| $r_4 = 50.7501$ | | |
| $d_4 = 4.429$ | | |
| $r_5 = 49.6999$ | | |
| $d_5 = 4.300$ | $n_3 = 1.80440$ | $v_3 = 39.58$ |
| $r_6 = 480.7704$ | | |
| $d_6 =$ variable | | |
| $r_7 = 60.0885$ (aspherical) | | |
| $d_7 = 2.000$ | $n_4 = 1.49216$ | $v_4 = 57.50$ |
| $r_8 = 79.4305$ | | |
| $d_8 = 0.100$ | | |
| $r_9 = 32.5256$ | | |
| $d_9 = 5.200$ | $n_5 = 1.61700$ | $v_5 = 62.79$ |
| $r_{10} = -92.2789$ | | |
| $d_{10} = 3.326$ | | |
| $r_{11} = 50.7888$ | | |
| $d_{11} = 4.005$ | $n_6 = 1.74320$ | $v_6 = 49.31$ |
| $r_{12} = -50.2872$ | | |
| $d_{12} = 1.300$ | $n_7 = 1.74950$ | $v_7 = 35.27$ |

-continued

Embodiment 1
f = 35.9 − 67.7  F No. = 2.9 − 3.6

| | | | |
|---|---|---|---|
| $r_{13} = 81.1312$ | | | |
| $d_{13} = 3.008$ | | | |
| $r_{14} = 746.4308$ | | | |
| $d_{14} = 1.000$ | | $n_8 = 1.75520$ | $v_8 = 27.51$ |
| $r_{15} = 23.3372$ | | | |
| $d_{15} = 4.500$ | | | |
| $r_{16} = -89.8587$ | | | |
| $d_{16} = 3.300$ | | $n_9 = 1.66680$ | $v_9 = 33.04$ |
| $r_{17} = -29.6676$ | | | |

| f | 35.9 | 50.0 | 67.7 |
|---|---|---|---|
| $d_6$ | 47.161 | 19.305 | 0.8 |

Coefficients of the aspherical surface $C = -8.5518 \times 10^{-6}$   $D = -5.6789 \times 10^{-9}$
$E = -4.4326 \times 10^{-12}$   $F = -1.6044 \times 10^{-14}$
$\Delta x/r_7 = -0.00424$   $d_4/f_W = 0.123$
$f_A/f_R = 10.379$   $|f_7|/f_W = 0.889$
$f_3/|f_F| = 0.904$   $f_8/f_R = 1.391$

Embodiment 2
f = 35.9 − 67.7  F No. = 2.9 − 3.6

| | | | |
|---|---|---|---|
| $r_1 = 84.0072$ | | | |
| $d_1 = 1.877$ | | $n_1 = 1.6968$ | $v_1 = 55.52$ |
| $r_2 = 30.1373$ | | | |
| $d_2 = 8.500$ | | | |
| $r_3 = -156.6003$ | | | |
| $d_3 = 1.388$ | | $n_2 = 1.6516$ | $v_2 = 58.52$ |
| $r_4 = 57.6863$ | | | |
| $d_4 = 4.145$ | | | |
| $r_5 = 52.9905$ | | | |
| $d_5 = 5.098$ | | $n_3 = 1.79952$ | $v_3 = 42.24$ |
| $r_6 = -2340.4491$ | | | |
| $d_6 = $ variable | | | |
| $r_7 = 63.0732$ (aspherical) | | | |
| $d_7 = 1.962$ | | $n_4 = 1.49216$ | $v_4 = 57.5$ |
| $r_8 = 117.8839$ | | | |
| $d_8 = 0.043$ | | | |
| $r_9 = 32.6381$ | | | |
| $d_9 = 4.964$ | | $n_5 = 1.61700$ | $v_5 = 62.79$ |
| $r_{10} = -95.5132$ | | | |
| $d_{10} = 3.172$ | | | |
| $r_{11} = 58.4663$ | | | |
| $d_{11} = 4.511$ | | $n_6 = 1.7200$ | $v_6 = 50.25$ |
| $r_{12} = -43.8854$ | | | |
| $d_{12} = 1.310$ | | $n_7 = 1.7495$ | $v_7 = 35.27$ |
| $r_{13} = 60.9263$ | | | |
| $d_{13} = 3.002$ | | | |
| $r_{14} = 102.9736$ | | | |
| $d_{14} = 0.972$ | | $n_8 = 1.74077$ | $v_8 = 27.79$ |
| $r_{15} = 22.6684$ | | | |
| $d_{15} = 4.364$ | | | |
| $r_{16} = -75.2193$ | | | |
| $d_{16} = 3.655$ | | $n_9 = 1.6668$ | $v_9 = 33.04$ |
| $r_{17} = -30.2374$ | | | |

| f | 35.9 | 50.0 | 67.7 |
|---|---|---|---|
| $d_6$ | 50.617 | 20.684 | 0.8 |

Coefficients of the aspherical surface $C = -8.4842 \times 10^{-6}$   $D = -5.6384 \times 10^{-9}$
$E = -5.675 \times 10^{-12}$   $F = -8.7779 \times 10^{-16}$
$\Delta x/r_7 = -0.004$   $d_4/f_W = 0.123$
$f_A/f_R = 5.713$   $|f_7|/f_W = 1.099$
$f_3/|f_F| = 0.812$   $f_8/f_R = 1.540$

Embodiment 3
f = 35.9 − 67.7  F No. = 2.9 − 3.6

| | | | |
|---|---|---|---|
| $r_1 = 58.9267$ | | | |
| $d_1 = 1.957$ | | $n_1 = 1.72916$ | $v_1 = 54.68$ |
| $r_2 = 27.2093$ | | | |
| $d_2 = 9.691$ | | | |
| $r_3 = -195.5763$ | | | |

Embodiment 3
f = 35.9 − 67.7  F No. = 2.9 − 3.6

| | | | |
|---|---|---|---|
| $d_3 = 1.595$ | | $n_2 = 1.6400$ | $v_2 = 60.09$ |
| $r_4 = 59.6287$ | | | |
| $d_4 = 3.827$ | | | |
| $r_5 = 47.8307$ | | | |
| $d_5 = 4.646$ | | $n_3 = 1.8340$ | $v_3 = 37.16$ |
| $r_6 = 190.9372$ | | | |
| $d_6 = $ variable | | | |
| $r_7 = 54.411$ (aspherical) | | | |
| $d_7 = 2.2$ | | $n_4 = 1.49216$ | $v_4 = 57.5$ |
| $r_8 = 267.1341$ | | | |
| $d_8 = 0.1$ | | | |
| $r_9 = 31.9972$ | | | |
| $d_9 = 4.503$ | | $n_5 = 1.6170$ | $v_5 = 62.79$ |
| $r_{10} = -192.6994$ | | | |
| $d_{10} = 3.763$ | | | |
| $r_{11} = 40.0207$ | | | |
| $d_{11} = 4.334$ | | $n_6 = 1.7432$ | $v_6 = 49.31$ |
| $r_{12} = -66.5344$ | | | |
| $d_{12} = 1.003$ | | $n_7 = 1.7495$ | $v_7 = 35.27$ |
| $r_{13} = 54.6416$ | | | |
| $d_{13} = 1.442$ | | | |
| $r_{14} = 166.6187$ | | | |
| $d_{14} = 1.022$ | | $n_8 = 1.7847$ | $v_8 = 26.22$ |
| $r_{15} = 20.7878$ | | | |
| $d_{15} = 5.174$ | | | |
| $r_{16} = -158.8882$ | | | |
| $d_{16} = 4.851$ | | $n_9 = 1.68893$ | $v_9 = 31.08$ |
| $r_{17} = -35.7676$ | | | |

| f | 35.9 | 50.0 | 67.7 |
|---|---|---|---|
| $d_6$ | 43.079 | 17.213 | 0.103 |

Coefficients of the aspherical surface $C = -5.8793 \times 10^{-6}$   $D = -3.6783 \times 10^{-9}$
$E = -3.2798 \times 10^{-12}$   $F = -2.0737 \times 10^{-16}$
$\Delta x/r_7 = -0.00318$   $d_4/f_W = 0.129$
$f_A/f_R = 3.078$   $|f_7|/f_W = 0.846$
$f_3/|f_F| = 1.029$   $f_8/f_R = 1.677$

Embodiment 4
f = 35.9 − 67.7  F No. = 2.9 − 3.6

| | | | |
|---|---|---|---|
| $r_1 = 56.5264$ | | | |
| $d_1 = 1.99$ | | $n_1 = 1.72916$ | $v_1 = 54.68$ |
| $r_2 = 28.8696$ | | | |
| $d_2 = 9.632$ | | | |
| $r_3 = -294.520$ | | | |
| $d_3 = 1.691$ | | $n_2 = 1.6516$ | $v_2 = 58.67$ |
| $r_4 = 45.7141$ | | | |
| $d_4 = 4.928$ | | | |
| $r_5 = 46.5958$ | | | |
| $d_5 = 3.80$ | | $n_3 = 1.8340$ | $v_3 = 37.16$ |
| $r_6 = 174.9368$ | | | |
| $d_6 = $ variable | | | |
| $r_7 = 62.4073$ (aspherical) | | | |
| $d_7 = 2.00$ | | $n_4 = 1.49216$ | $v_4 = 57.5$ |
| $r_8 = 141.992$ | | | |
| $d_8 = 0.10$ | | | |
| $r_9 = 30.7359$ | | | |
| $d_9 = 5.20$ | | $n_5 = 1.61700$ | $v_5 = 62.79$ |
| $r_{10} = -90.4209$ | | | |
| $d_{10} = 3.753$ | | | |
| $r_{11} = 44.6883$ | | | |
| $d_{11} = 4.121$ | | $n_6 = 1.7432$ | $v_6 = 49.31$ |
| $r_{12} = -75.2903$ | | | |
| $d_{12} = 1.020$ | | $n_7 = 1.7495$ | $v_7 = 35.27$ |
| $r_{13} = 52.6476$ | | | |
| $d_{13} = 1.138$ | | | |
| $r_{14} = 266.1049$ | | | |
| $d_{14} = 1.00$ | | $n_8 = 1.7847$ | $v_8 = 26.22$ |
| $r_{15} = 22.2006$ | | | |
| $d_{15} = 4.500$ | | | |
| $r_{16} = -76.086$ | | | |
| $d_{16} = 3.383$ | | $n_9 = 1.68893$ | $v_9 = 31.08$ |
| $r_{17} = -28.7101$ | | | |

| f | 35.9 | 50.0 | 67.7 |
|---|---|---|---|

-continued

Embodiment 4
f = 35.9 − 67.7  F No. = 2.9 − 3.6

| $d_6$ | 43.504 | 17.845 | 0.8 |
|---|---|---|---|

Coefficients of the aspherical surface $C = -9.7815 \times 10^{-6}$   $D = -6.6935 \times 10^{-9}$
$E = -9.0242 \times 10^{-12}$  $F = -2.1336 \times 10^{-14}$
$\Delta x/r_7 = -0.00474$      $d_4/f_W = 0.137$
$f_A/f_R = 4.983$              $|f_7|/f_W = 0.861$
$f_3/|f_F| = 1.036$            $f_8/f_R = 1.444$ where $r_1, r_2, \ldots, r_{17}$ respectively represent the radii of curvature of respective lens surface, $d_1, d_2, \ldots, d_{16}$ respectively represent the thickness of respective lenses and the airspaces between respective lenses, $n_1, n_2, \ldots, n_9$ respectively represent the refractive indices of respective lenses, $\nu_1, \nu_2, \ldots, \nu_9$ respectively represent Abbe's numbers of respective lenses, and f represents the focal length of the entire system.

Embodiments 1, 3 and 4 have the lens configuration as shown in FIG. 1. In these Embodiments, the diaphragm is arranged at 1.526, 2.34, 1.526 at the image side of the surface $r_{10}$, respectively. The outermost surface ($r_7$) of the rear lens group towards the object is formed as an aspherical surface.

Figure 2:
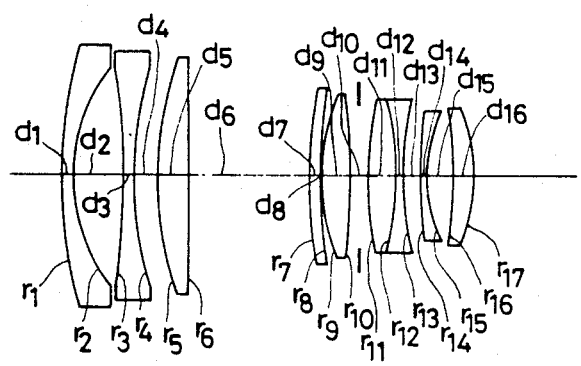
FIG. 2 shows a sectional view of Embodiment 2 according to the present invention.
Figure 3:
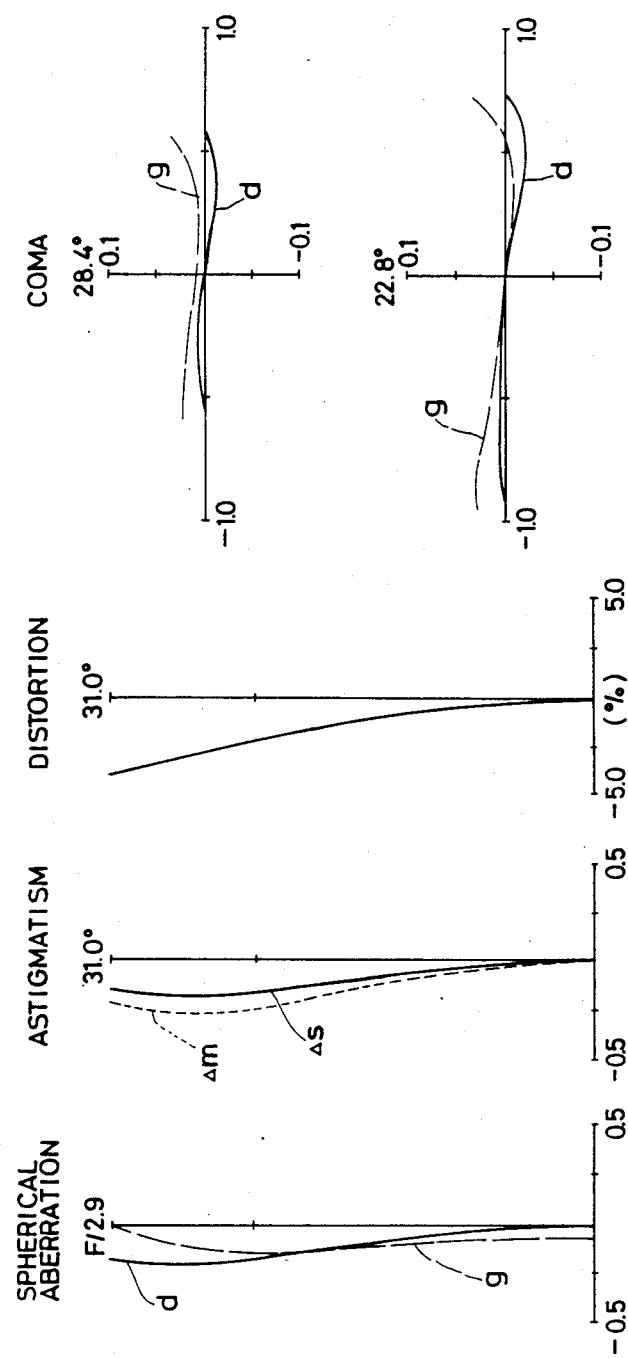
FIG. 3, FIG. 4 and FIG. 5 respectively show graphs illustrating aberration curves of Embodiment 1 at $f = 35.9$, 50.0 and 67.7.
Figure 4:
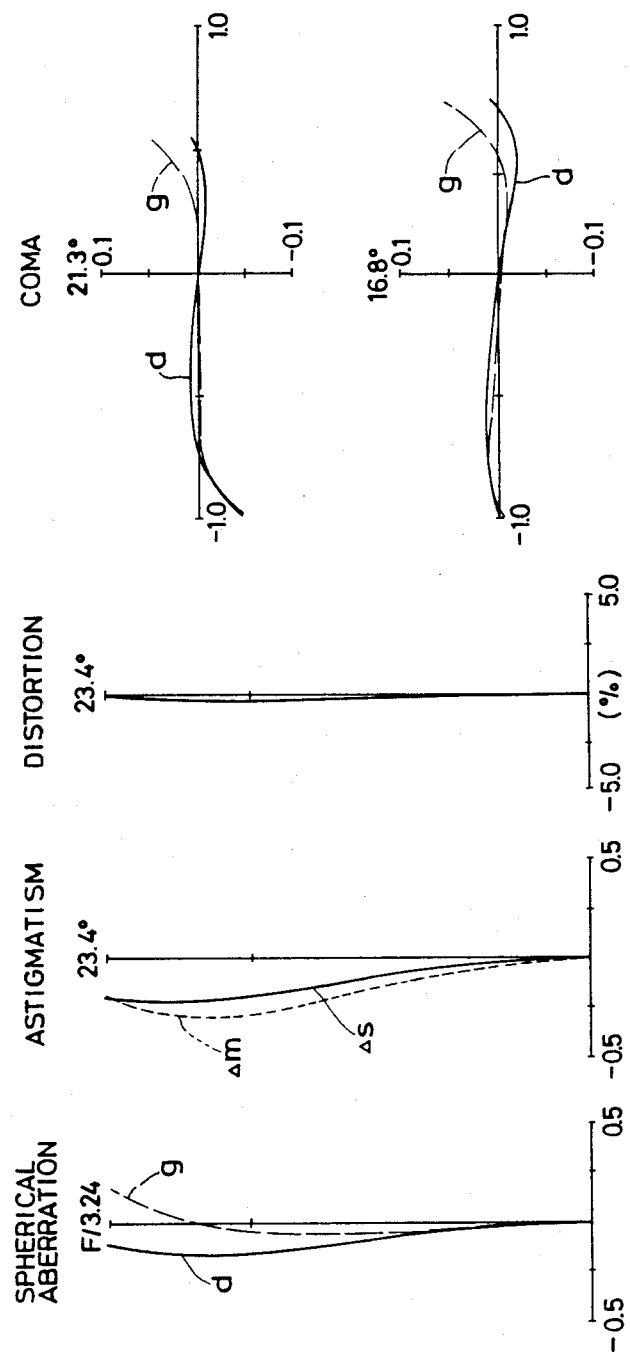
Figure 5:
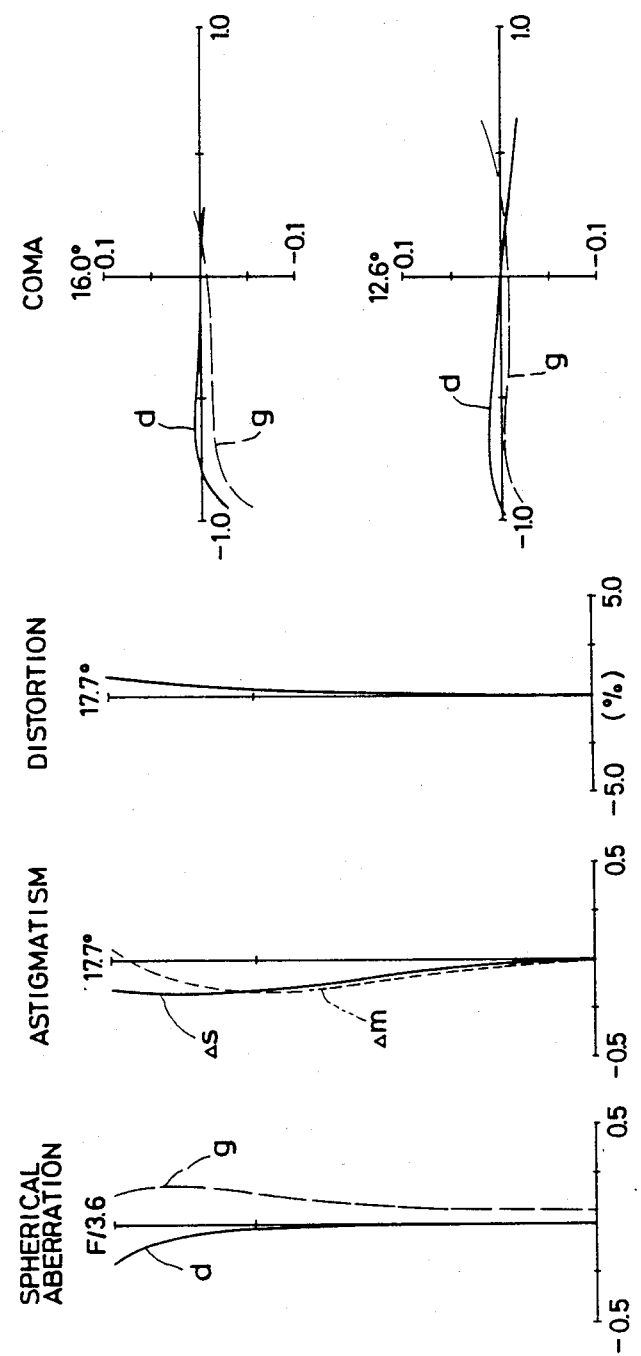
Figure 6:
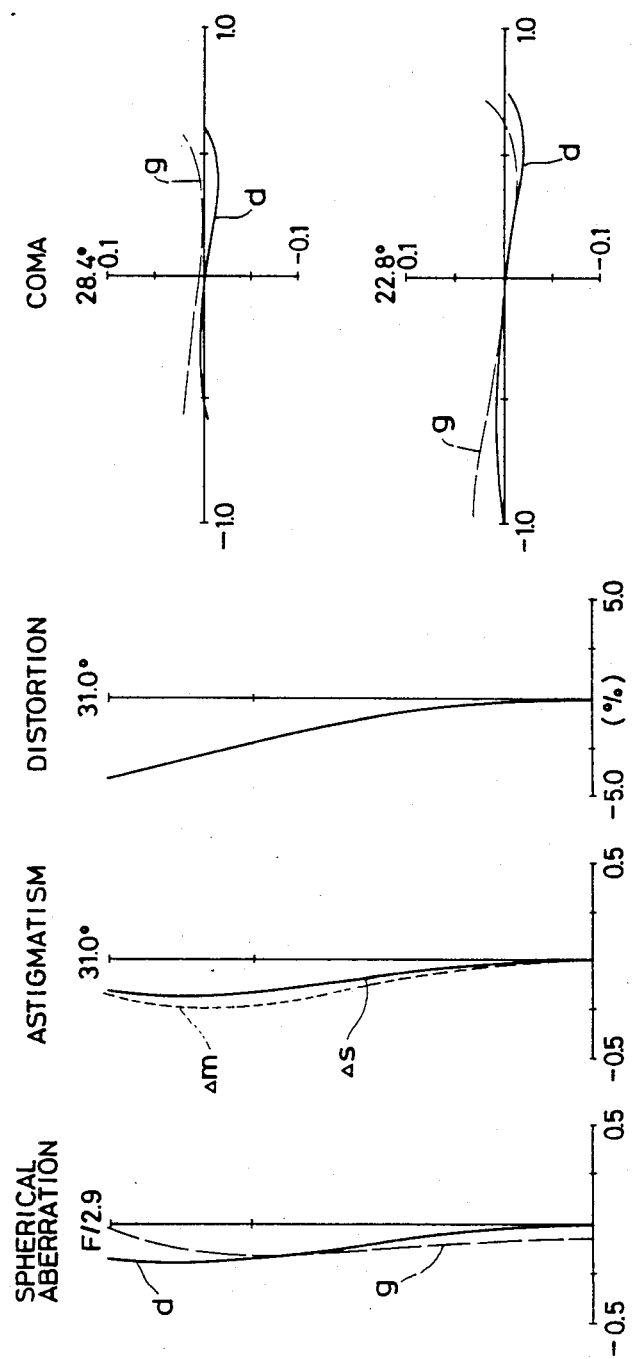
FIG. 6, FIG. 7 and FIG. 8 respectively show graphs illustrating aberration curves of Embodiment 2 at $f = 35.9$, 50.0 and 67.7.
Figure 7:
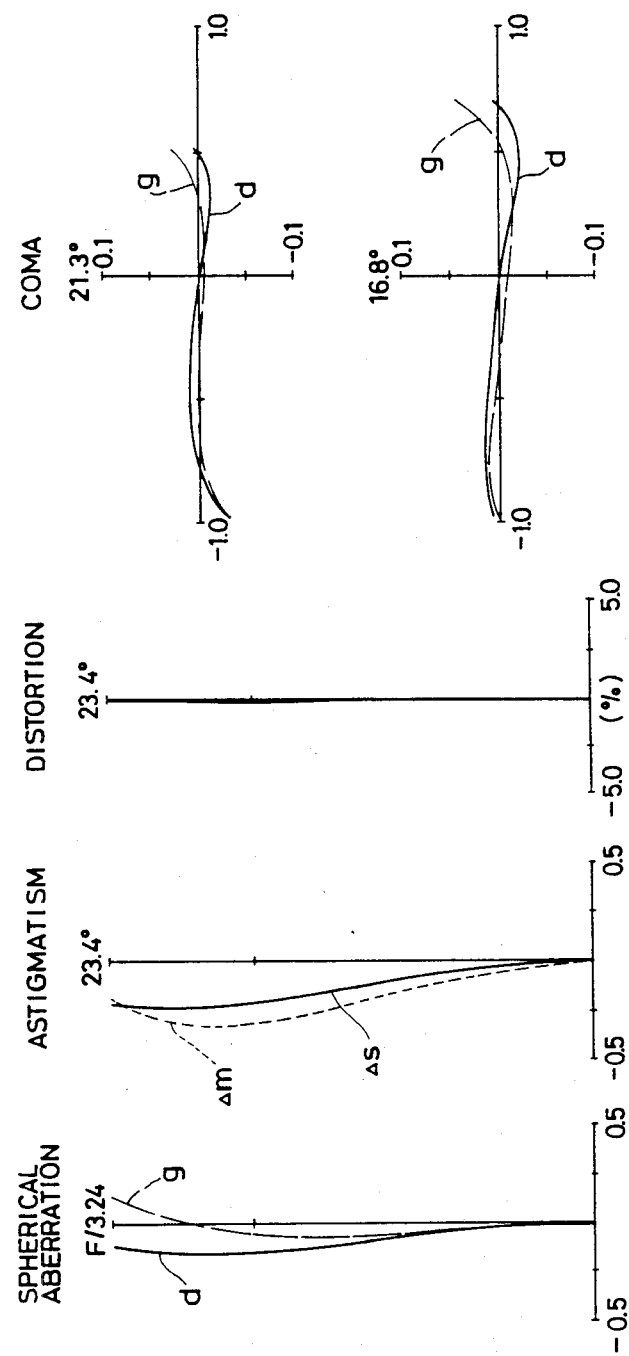
Figure 8:
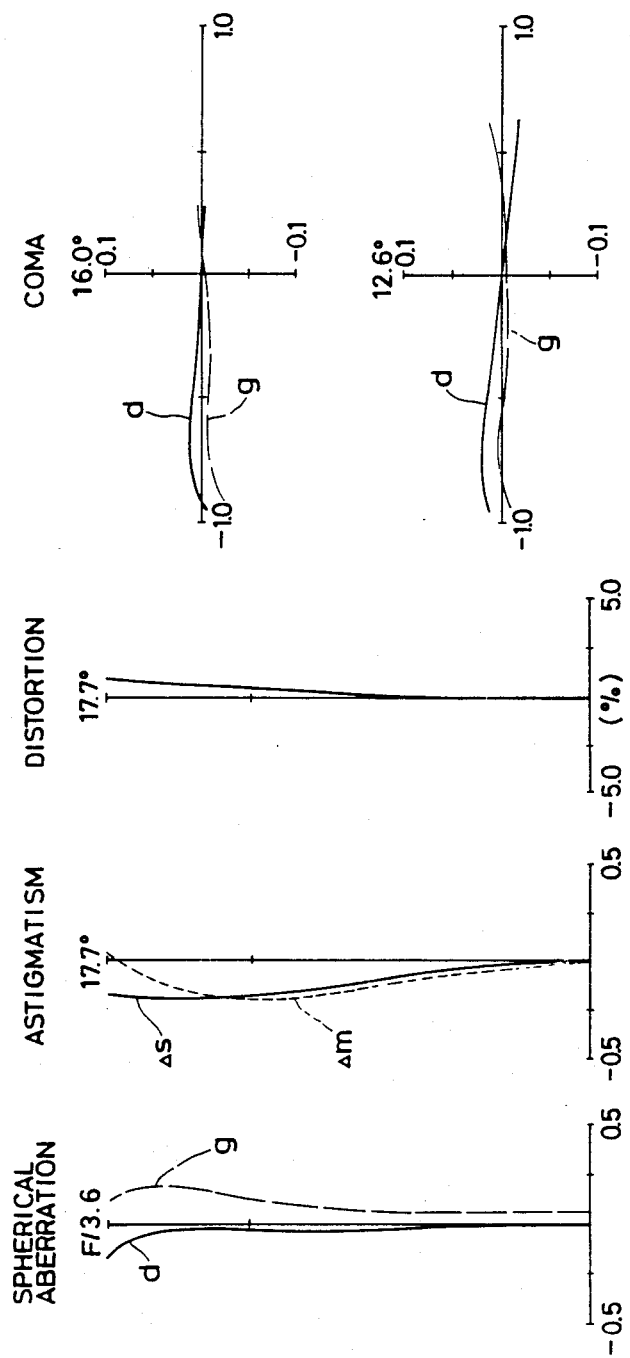
Figure 9:
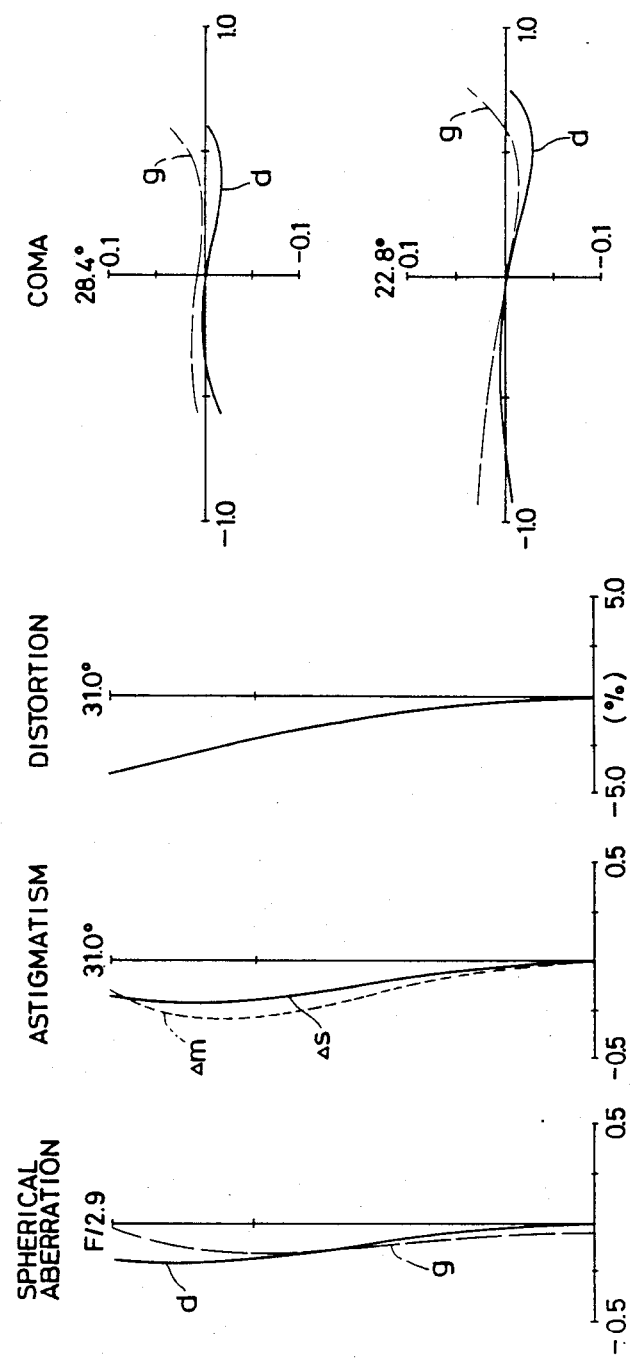
FIG. 9, FIG. 10 and FIG. 11 respectively show graphs illustrating aberration curves of Embodiment 3 at $f = 35.9$, 50.0 and 67.7.
Figure 10:
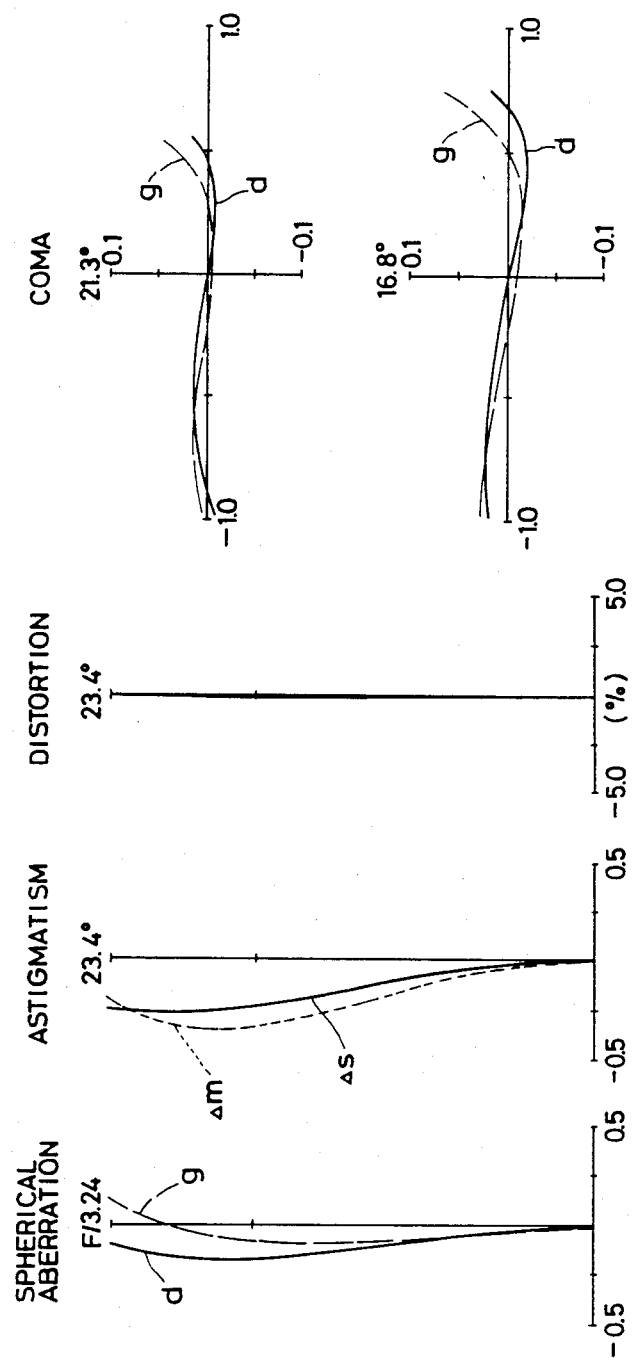
Figure 11:
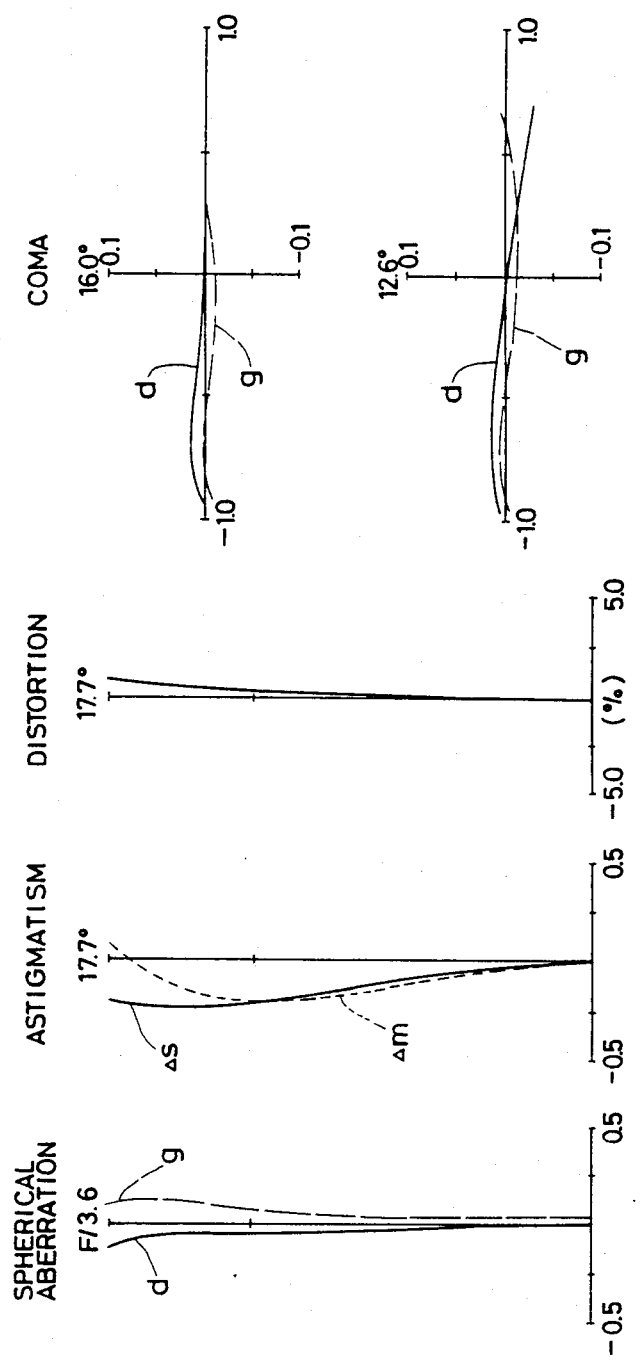
Figure 12:
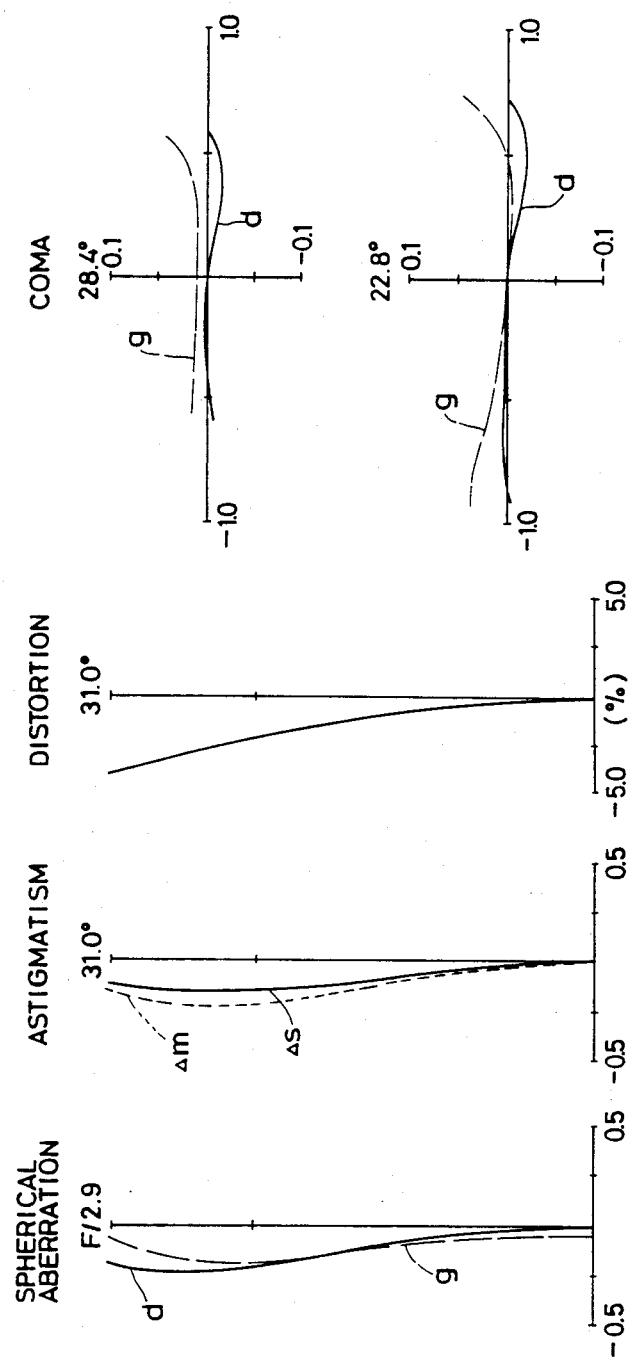
FIG. 12, FIG. 13 and FIG. 14 respectively show graphs illustrating aberration curves of Embodiment 4 at $f = 35.9$, 50.0 and 67.7.
Figure 13:
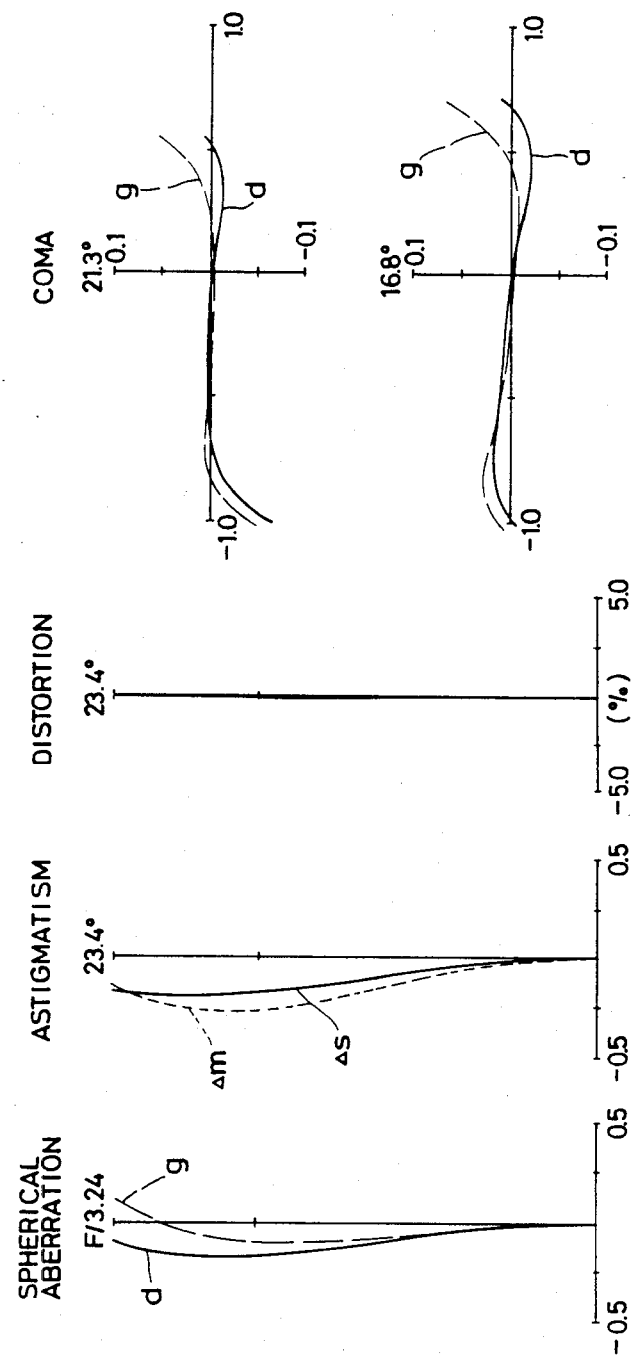
Figure 14:
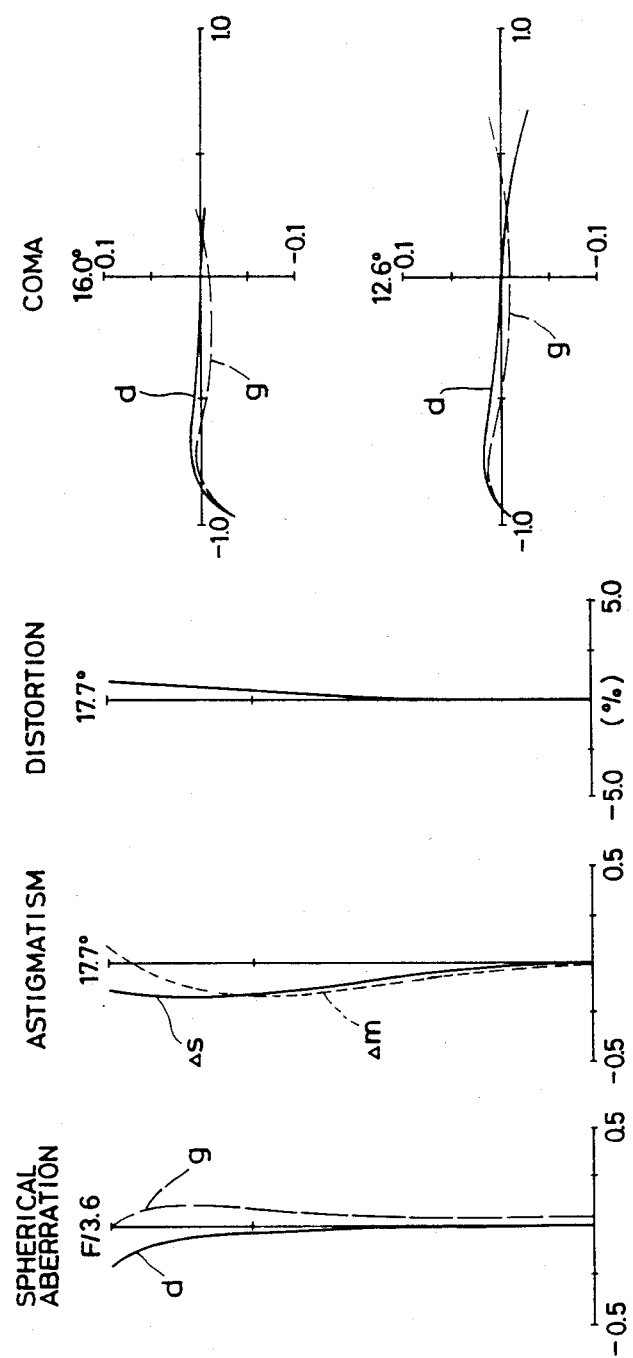
Figure 15:
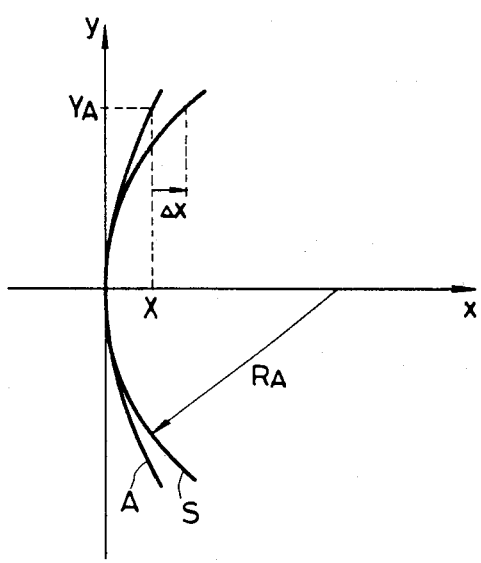
FIG. 15 shows a diagramatic view illustrating the shape of an aspherical surface.

Embodiment 2 has the lens configuration as shown in FIG. 2. The diaphragm of this Embodiment is arranged at 1.471 at the image side of the surface $r_{10}$. The aspherical surface is the outermost surface ($r_7$) of the rear lens group towards the object.

As is mentioned above in detail and is evident from each of the preferred Embodiments, the zoom lens system according to the present invention has a large aperture ratio and the aberrations thereof are well corrected although the zoom lens system has a small number of lenses and is compact.

I claim:

1. A standard zoom lens system with a large aperture ratio comprising a front lens group having a negative refracting power, a rear lens group having a positive refractive power, in which the airspace between said front lens group and said rear lens group is variable for effecting zooming, said zoom lens system comprising a diaphragm and a positive lens component disposed at the outer side of said diaphragm on the object side, and at least one surface of said positive lens component being aspherical satisfying the following condition (1):

$$-0.001 > \Delta x/R_A > -0.007 \quad (1)$$

where $R_A$ represents the radius of curvature of a reference spherical surface, $\Delta x$ represents the difference parallel to the optical axis between the point on said aspherical surface and that on said reference spherical surface at the maximum effective aperture of the aspherical lens.

2. A standard zoom lens system with a large aperture ratio according to claim 1, said front lens group comprising, in the order from the object, a first lens component being a negative meniscus lens having at its image side a surface with a smaller radius of curvature, a second lens component being a negative lens having at its image side a surface with a smaller radius of curvature, and a third lens component being a positive lens having at its object side a surface with a smaller radius of curvature.

3. A standard zoom lens system with a large aperture ratio according to claim 2, a positive meniscus lens being arranged in said rear lens group at the outer side of said diaphragm towards the object, the object side surface of said positive meniscus lens being formed as an aspherical surface, and said standard zoom lens system satisfying the following condition (2):

$$f_A/f_R > 2.5 \quad (2)$$

where $f_A$ represents the focal length of said aspherical lens and $f_R$ represents the focal length of said rear lens group.

4. A standard zoom lens system with a large aperture ratio according to claim 3, said rear lens group comprising, in the order from the object, a fourth lens component being a positive lens, a fifth lens component being a positive lens, a six lens component being a positive cemented meniscus lens, a seventh lens component being a negative lens having at its image side a surface with a smaller radius of curvature and an eighth lens component being a positive meniscus lens having at its image side a surface with a smaller radius of curvature, said aspherical surface being formed at the object side of said fourth lens component, and said standard zoom lens system satisfying the following conditions (3) through (6):

$$0.7 < f_3/|f_F| < 1.2 \quad (3)$$

$$0.1 < d_4/f_W < 0.16 \quad (4)$$

$$0.7 < |f_7|/f_W < 1.3 \quad (5)$$

$$1.2 < f_8/f_R < 1.8 \quad (6)$$

where $f_A$ represents the focal length of said aspherical lens, $f_F$ and $f_R$ respectively represents the focal lengths of said front lens group and said rear lens group, $f_3$, $f_7$, $f_8$ respectively represent the focal lengths of said third, seventh, eighth lens components, $f_W$ represents the focal length of the entire system at the wide-position, and $d_4$ represents the airspace between said second lens component and said third lens component.

5. A standard zoom lens system with a large aperture ratio according to claim 4, wherein said aspherical surface is expressed by the following formula and said standard zoom lens system has the following numerical data:

| f = 35.9-67.7 | F No. = 2.9-3.6 | | |
|---|---|---|---|
| $r_1 = 69.6747$ | | | |
| $d_1 = 2.150$ | | $n_1 = 1.72916$ | $\nu_1 = 54.68$ |
| $r_2 = 30.0009$ | | | |
| $d_2 = 9.003$ | | | |
| $r_3 = -216.6740$ | | | |
| $d_3 = 1.830$ | | $n_2 = 1.65830$ | $\nu_2 = 57.33$ |
| $r_4 = 50.7501$ | | | |
| $d_4 = 4.429$ | | | |
| $r_5 = 49.6999$ | | | |
| $d_5 = 4.300$ | | $n_3 = 1.80440$ | $\nu_3 = 39.58$ |
| $r_6 = 480.7704$ | | | |
| $d_6 = $ variable | | | |
| $r_7 = 60.0885$ (aspherical) | | | |
| $d_7 = 2.000$ | | $n_4 = 1.49216$ | $\nu_4 = 57.50$ |
| $r_8 = 79.4305$ | | | |
| $d_8 = 0.100$ | | | |
| $r_9 = 32.5256$ | | | |
| $d_9 = 5.200$ | | $n_5 = 1.61700$ | $\nu_5 = 62.79$ |
| $r_{10} = -92.2789$ | | | |
| $d_{10} = 3.326$ | | | |
| $r_{11} = 50.7888$ | | | |
| $d_{11} = 4.005$ | | $n_6 = 1.74320$ | $\nu_6 = 49.31$ |
| $r_{12} = -50.2872$ | | | |

-continued

| | | |
|---|---|---|
| $d_{12} = 1.300$ | $n_7 = 1.74950$ | $v_7 = 35.27$ |
| $r_{13} = 81.1312$ | | |
| $d_{13} = 3.008$ | | |
| $r_{14} = 746.4308$ | | |
| $d_{14} = 1.000$ | $n_8 = 1.75520$ | $v_8 = 27.51$ |
| $r_{15} = 23.3372$ | | |
| $d_{15} = 4.500$ | | |
| $r_{16} = -89.8587$ | | |
| $d_{16} = 3.300$ | $n_9 = 1.66680$ | $v_9 = 33.04$ |
| $r_{17} = -29.6676$ | | |

| f | 35.9 | 50.0 | 67.7 |
|---|---|---|---|
| $d_6$ | 47.161 | 19.305 | 0.8 |
| $C = -8.5518 \times 10^{-6}$ | | $D = -5.6789 \times 10^{-9}$ | |
| $E = -4.4326 \times 10^{-12}$ | | $F = -1.6044 \times 10^{-14}$ | |
| $\Delta x/r_7 = -0.00424$ | | $d_4/f_W = 0.123$ | |
| $f_A/f_R = 10.379$ | | $|f_7|/f_W = 0.889$ | |
| $f_3/|f_F| = 0.904$ | | $f_8/f_R = 1.391$ | |

$$x = \frac{y^2/R_A}{1 + \sqrt{1 - (y/R_A)^2}} + By^2 + Cy^4 + Dy^6 + Ey^8 + Fy^{10} + \ldots$$

where $r_1, r_2, \ldots, r_{17}$ respectively represent the radii of curvature of respective lens surface, $d_1, d_2, \ldots, d_{16}$ respectively represent the thickness of respective lenses and the airspaces between respective lenses, $n_1, n_2, \ldots, n_9$ respectively represent the refractive indices of respective lenses, $v_1, v_2, \ldots, v_9$ respectively represent Abbe's numbers of respective lenses, and f represents the focal length of the entire system, x represents the distance between the arbitrary point on an aspherical surface and the tangential plane which is tangential to said aspherical surface at the vertex thereof, y represents the distance between said arbitrary point and the optical axis, and B, C, D, ... represent the coefficients of said aspherical surface.

6. A standard zoom lens system with a large aperture ratio according to claim 4, wherein said aspherical surface is expressed by the following formula and said standard zoom lens system has the following numerical data:

| f = 35.9–67.7 | F No. = 2.9–3.5 | |
|---|---|---|
| $r_1 = 84.0072$ | | |
| $d_1 = 1.877$ | $n_1 = 1.6968$ | $v_1 = 55.52$ |
| $r_2 = 30.1373$ | | |
| $d_2 = 8.500$ | | |
| $r_3 = -156.6003$ | | |
| $d_3 = 1.388$ | $n_2 = 1.6516$ | $v_2 = 58.52$ |
| $r_4 = 57.6863$ | | |
| $d_4 = 4.145$ | | |
| $r_5 = 52.9905$ | | |
| $d_5 = 5.098$ | $n_3 = 1.79952$ | $v_3 = 42.24$ |
| $r_6 = -2340.4491$ | | |
| $d_6 = $ variable | | |
| $r_7 = 63.0732$ (aspherical) | | |
| $d_7 = 1.962$ | $n_4 = 1.49216$ | $v_4 = 57.5$ |
| $r_8 = 117.8839$ | | |
| $d_8 = 0.043$ | | |
| $r_9 = 32.6381$ | | |
| $d_9 = 4.964$ | $n_5 = 1.61700$ | $v_5 = 62.79$ |
| $r_{10} = -95.5132$ | | |
| $d_{10} = 3.172$ | | |
| $r_{11} = 58.4663$ | | |
| $d_{11} = 4.511$ | $n_6 = 1.7200$ | $v_6 = 50.25$ |
| $r_{12} = -43.8854$ | | |
| $d_{12} = 1.310$ | $n_7 = 1.7495$ | $v_7 = 35.27$ |
| $r_{13} = 60.9263$ | | |
| $d_{13} = 3.002$ | | |
| $r_{14} = 102.9736$ | | |
| $d_{14} = 0.972$ | $n_8 = 1.74077$ | $v_8 = 27.79$ |
| $r_{15} = 22.6684$ | | |
| $d_{15} = 4.364$ | | |
| $r_{16} = -75.2193$ | | |
| $d_{16} = 3.655$ | $n_9 = 1.6668$ | $v_9 = 33.04$ |
| $r_{17} = -30.2374$ | | |

| f | 35.9 | 50.0 | 67.7 |
|---|---|---|---|
| $d_6$ | 50.617 | 20.684 | 0.8 |
| $C = -8.4842 \times 10^{-6}$ | | $D = -5.6384 \times 10^{-9}$ | |
| $E = -5.675 \times 10^{-12}$ | | $F = -8.7779 \times 10^{-16}$ | |
| $\Delta x/r_7 = -0.004$ | | $d_4/f_W = 0.123$ | |
| $f_A/f_R = 5.713$ | | $|f_7|/f_W = 1.099$ | |
| $f_3/|f_F| = 0.812$ | | $f_8/f_R = 1.540$ | |

$$x = \frac{y^2/R_A}{1 + \sqrt{1 - (y/R_A)^2}} + By^2 + Cy^4 + Dy^6 + Ey^8 + Fy^{10} + \ldots$$

where $r_1, r_2, \ldots, r_{17}$ respectively represent the radii of curvature of respective lens surface, $d_1, d_2, \ldots, d_{16}$ respectively represent the thickness of respective lenses and the airspaces between respective lenses, $n_1, n_2, \ldots, n_9$ respectively represent the refractive indices of respective lenses, $v_1, v_2, \ldots, v_9$ respectively represent Abbe's numbers of respective lenses, and f represents the focal length of the entire system, x represents the distance between the arbitrary point on an aspherical surface and the tangential plane which is tangential to said aspherical surface at the vertex thereof, y represents the distance between said arbitrary point and the optical axis, and B, C, D, ... represent the coefficients of said aspherical surface.

7. A standard zoom lens system with a large aperture ratio according to claim 4, wherein said aspherical surface is expressed by the following formula and said standard zoom lens system has the following numerical data:

| f = 35.9–67.7 | F No. = 2.9–3.6 | |
|---|---|---|
| $r_1 = 58.9267$ | | |
| $d_1 = 1.957$ | $n_1 = 1.72916$ | $v_1 = 54.68$ |
| $r_2 = 27.2093$ | | |
| $d_2 = 9.691$ | | |
| $r_3 = -195.5763$ | | |
| $d_3 = 1.595$ | $n_2 = 1.6400$ | $v_2 = 60.09$ |
| $r_4 = 59.6287$ | | |
| $d_4 = 3.827$ | | |
| $r_5 = 47.8307$ | | |
| $d_5 = 4.646$ | $n_3 = 1.8340$ | $v_3 = 37.16$ |
| $r_6 = 190.9372$ | | |
| $d_6 = $ variable | | |
| $r_7 = 54.411$ (aspherical) | | |
| $d_7 = 2.2$ | $n_4 = 1.49216$ | $v_4 = 57.5$ |
| $r_8 = 267.1341$ | | |
| $d_8 = 0.1$ | | |
| $r_9 = 31.9972$ | | |
| $d_9 = 4.503$ | $n_5 = 1.6170$ | $v_5 = 62.79$ |
| $r_{10} = -192.6994$ | | |
| $d_{10} = 3.763$ | | |
| $r_{11} = 40.0207$ | | |
| $d_{11} = 4.334$ | $n_6 = 1.7432$ | $v_6 = 49.31$ |
| $r_{12} = -66.5344$ | | |
| $d_{12} = 1.003$ | $n_7 = 1.7495$ | $v_7 = 35.27$ |
| $r_{13} = 54.6416$ | | |
| $d_{13} = 1.442$ | | |
| $r_{14} = 166.6187$ | | |
| $d_{14} = 1.022$ | $n_8 = 1.7847$ | $v_8 = 26.22$ |
| $r_{15} = 20.7878$ | | |
| $d_{15} = 5.174$ | | |
| $r_{16} = -158.8882$ | | |
| $d_{16} = 4.851$ | $n_9 = 1.68893$ | $v_9 = 31.08$ |
| $r_{17} = -35.7676$ | | |

| f | 35.9 | 50.0 | 67.7 |
|---|---|---|---|
| $d_6$ | 43.079 | 17.213 | 0.103 |
| $C = -5.8793 \times 10^{-6}$ | | $D = -3.6783 \times 10^{-9}$ | |
| $E = -3.2798 \times 10^{-12}$ | | $F = -2.0737 \times 10^{-16}$ | |
| $\Delta x/r_7 = -0.00318$ | | $d_4/f_W = 0.129$ | |
| $f_A/f_R = 3.078$ | | $|f_7|/f_W = 0.846$ | |

-continued

| | |
|---|---|
| $f_3/\|f_F\| = 1.029$ | $f_8/f_R = 1.677$ |

$$x = \frac{y^2/R_A}{1 + \sqrt{1 - (y/R_A)^2}} + By^2 + Cy^4 + Dy^6 + Ey^8 + Fy^{10} + \ldots$$

where $r_1, r_2, \ldots, r_{17}$ respectively represent the radii of curvature of respective lens surface, $d_1, d_2, \ldots, d_{16}$ respectively represent the thickness of respective lenses and the airspaces between respective lenses, $n_1, n_2, \ldots, n_9$ respectively represent the refractive indices of respective lenses, $v_1, v_2, \ldots, v_9$ respectively represent Abbe's numbers of respective lenses, and f represents the focal length of the entire system, x represents the distance between the arbitrary point on an aspherical surface and the tangential plane which is tangential to said aspherical surface at the vertex thereof, y represents the distance between said arbitrary point and the optical axis, and B, C, D, ... represent the coefficients of said aspherical surface.

8. A standard zoom lens system with a large aperture ratio according to claim 4, wherein said aspherical surface is expressed by the following formula and said standard zoom lens system has the following numerical data:

| f = 35.9–67.7 | F No. = 2.9–3.6 | |
|---|---|---|
| $r_1 = 56.5264$ | | |
| $d_1 = 1.99$ | $n_1 = 1.72916$ | $v_1 = 54.68$ |
| $r_2 = 28.8696$ | | |
| $d_2 = 9.632$ | | |
| $r_3 = -294.5200$ | | |
| $d_3 = 1.691$ | $n_2 = 1.6516$ | $v_2 = 58.67$ |
| $r_4 = 45.7141$ | | |
| $d_4 = 4.928$ | | |
| $r_5 = 46.5958$ | | |
| $d_5 = 3.80$ | $n_3 = 1.8340$ | $v_3 = 37.16$ |
| $r_6 = 174.9368$ | | |
| $d_6$ = variable | | |
| $r_7 = 62.4073$ (aspherical) | | |
| $d_7 = 2.00$ | $n_4 = 1.49216$ | $v_4 = 57.5$ |
| $r_8 = 141.992$ | | |
| $d_8 = 0.10$ | | |
| $r_9 = 30.7359$ | | |
| $d_9 = 5.20$ | $n_5 = 1.61700$ | $v_5 = 62.79$ |
| $r_{10} = -90.4209$ | | |
| $d_{10} = 3.753$ | | |
| $r_{11} = 44.6883$ | | |
| $d_{11} = 4.121$ | $n_6 = 1.7432$ | $v_6 = 49.31$ |
| $r_{12} = -75.2903$ | | |
| $d_{12} = 1.020$ | $n_7 = 1.7495$ | $v_7 = 35.27$ |
| $r_{13} = 52.6476$ | | |
| $d_{13} = 1.138$ | | |
| $r_{14} = 266.1049$ | | |
| $d_{14} = 1.00$ | $n_8 = 1.7847$ | $v_8 = 26.22$ |
| $r_{15} = 22.2006$ | | |
| $d_{15} = 4.500$ | | |
| $r_{16} = -76.086$ | | |
| $d_{16} = 3.383$ | $n_9 = 1.68893$ | $v_9 = 31.08$ |
| $r_{17} = -28.7101$ | | |
| f | 35.9 | 50.0 | 67.7 |
| $d_6$ | 43.504 | 17.845 | 0.8 |

$C = -9.7815 \times 10^{-6}$  $D = -6.6935 \times 10^{-9}$
$E = -9.0242 \times 10^{-12}$  $F = -2.1336 \times 10^{-14}$
$\Delta x/r_7 = -0.00474$  $d_4/f_W = 0.137$
$f_A/f_R = 4.983$  $|f_7|/f_W = 0.861$
$f_3/|f_F| = 1.036$  $f_8/f_R = 1.444$ $$x = \frac{y^2/R_A}{1 + \sqrt{1 - (y/R_A)^2}} + By^2 + Cy^4 + Dy^6 + Ey^8 + Fy^{10} + \ldots$$

where $r_1, r_2, \ldots, r_{17}$ respectively represent the radii of curvature of respective lens surface, $d_1, d_2, \ldots, d_{16}$ respectively represent the thickness of respective lenses and the airspaces between respective lenses, $n_1, n_2, \ldots, n_9$ respectively represent the refractive indices of respective lenses, $v_1, v_2, \ldots, v_9$ respectively represent Abbe's numbers of respective lenses, and f represents the focal length of the entire system, x represents the distance between the arbitrary point on an aspherical surface and the tangential plane which is tangential to said aspherical surface at the vertex thereof, y represents the distance between said arbitrary point and the optical axis, and B, C, D, ... represent the coefficients of said aspherical surface.

* * * * *